United States Patent
Tews et al.

(10) Patent No.: US 6,489,716 B1
(45) Date of Patent: Dec. 3, 2002

(54) COMPACT, ENERGY-SAVING LAMP

(76) Inventors: Walter Tews, Lomonossowallee 39, D-17491 Griefswald (DE); Gundula Roth, Dorfstrasse 13a, D-17498 Levenhagen (DE); Ina Fethke, Erwin-Haak-Weg 11, D-17489 Griefswald (DE); Jens Klimke, Peter-Warschow-Strasse 43, D-17489 Griefswald (DE)

( * ) Notice: Subject to any disclaimer, the term of this patent is extended or adjusted under 35 U.S.C. 154(b) by 0 days.

(21) Appl. No.: 09/403,138

(22) PCT Filed: Jun. 5, 1998

(86) PCT No.: PCT/DE98/01564

§ 371 (c)(1),
(2), (4) Date: Oct. 14, 1999

(87) PCT Pub. No.: WO99/41768

PCT Pub. Date: Aug. 19, 1999

(30) Foreign Application Priority Data

Feb. 16, 1998 (DE) .......................................... 198 06 213

(51) Int. Cl.$^7$ .............................. H01J 63/04; H01J 1/62
(52) U.S. Cl. ....................... 313/486; 313/483; 313/485; 313/639; 313/640; 252/301.4 R
(58) Field of Search ................................ 313/486, 487, 313/485, 483, 639, 640; 252/301.4 R

(56) References Cited

U.S. PATENT DOCUMENTS

| | | | |
|---|---|---|---|
| 4,319,161 A | * 3/1982 | Looye et al. ............... | 313/486 |
| 5,602,444 A | * 2/1997 | Jansma ....................... | 313/489 |
| 5,604,396 A | * 2/1997 | Watanabe et al. ........... | 313/485 |
| 5,612,590 A | 3/1997 | Trushell et al. ............. | 313/487 |
| 5,838,100 A | * 11/1998 | Jansma ....................... | 313/485 |
| 6,085,971 A | * 7/2000 | Tews et al. ........... | 252/301.4 P |

FOREIGN PATENT DOCUMENTS

| | | | |
|---|---|---|---|
| EP | 0 100 122 A1 | 2/1984 | ............ H01J/61/44 |
| EP | 0 267 030 A2 | 5/1988 | ............ D04H/3/10 |
| EP | 0 488 330 A2 | 6/1992 | ............ H01J/61/44 |
| GB | 2 058 117 | 4/1981 | ............ C09K/11/28 |
| JP | 57128780 | 8/1982 | ......... C09K/11/477 |
| JP | 067030 | * 12/1982 | ............ H01J/61/35 |

* cited by examiner

Primary Examiner—Nimeshkumar D. Patel
Assistant Examiner—Sikha Roy
(74) Attorney, Agent, or Firm—Scully, Scott, Murphy & Presser

(57) ABSTRACT

A compact energy lamp having high luminous flux, long life and a very similar color temperature of between 2300° K and 6500° K which includes a vacuum-type discharge vessel filled with mercury and a noble gas. The inside of the discharge vessel is provided with a luminescent layer and is provided with means for maintaining discharge. The luminescent layer includes two phosphors. The first phosphor is a green-emitting gadolinium magnesium borate silicate, activated with cerium and terbium, and the second phosphor is yttrium oxide: $Eu^{3+}$, which emits in the red spectral region.

8 Claims, No Drawings

COMPACT, ENERGY-SAVING LAMP

The invention relates to a compact energy saving lamp which is distinguished by high luminous flux and very good color rendering characteristics in conjunction with long life. The field of application is that of mercury vapor low-pressure discharge lamps in lighting and illumination technology.

Fluorescent lamps in general, when a suitable excited gas is discharged involving suitable phosphors, generate visible light for illumination purposes.

Particularly widely used for interior lighting are compact mercury vapor low-pressure discharge lamps, comprising a glass bulb which is fabricated so as to be vacuum-tight and is filled with mercury and noble gas and on its inside is provided with a phosphor layer which converts the short-wave mercury resonance radiation having energies of about 6.71 eV and 4.88 eV into visible light.

Conventional compact energy saving lamps have lives of about 8,000 hours and, depending on output, type and color temperature, have a luminous flux of between about 250 lm and 4,300 lm.

The energy saving lamp operating in accordance with the three-band principle comprises the blue mercury resonance radiation and also a green component, which is particularly important for light output ratio and luminous flux, and in addition the phosphor Eu-activated yttrium oxide (YOX) as the red component and, in lamps of elevated color temperature, the phosphor Eu-activated aluminate such as, for example, BAM and/or SAE as an additional broadband blue component.

In fluorescent lamps, in particular compact lamps but also three-band fluorescent lamps, preferential use is made, as green components, of compounds which, owing to their typical terbium emission, are narrowerband emitters with a maximum wavelength of about 541–543 nm. These include the phosphors cerium magnesium aluminate: Tb (CAT) as claimed in AT 351 635, lanthanum phosphate: Ce, Tb (LAP) as claimed in DE 33 26 921 and U.S. Pat. No. 4,891,550, and lanthanum phosphate silicate: Ce, Tb (LAPS) as claimed in DE 32 48 809 and $Y_2SiO_5$: Ce, Tb as claimed in EP 037 688 as the most important representatives. All these phosphors are distinguished by high temperature stability and light output ratio. Drawbacks of these compounds are the high costs, caused by the preparation temperatures required of 1300° C. to 1600° C. Moreover, the stability of the phosphors overall is too low with respect to the discharge when the fluorescent lamp is lit, thus limiting the useful life of the latter to about 8,000 hours.

EP 023 068 describes a fluorescent lamp which employs the phosphor gadolinium magnesium pentaborate: Ce, Tb (CBT) having an emission maximum at 542 nm. In addition to comparably good emission characteristics, this phosphor has a higher stability compared with the phosphors CAT and LAP.

Catalogs of various fluorescent lamp manufacturers disclose that in the case of compact energy saving lamps it is possible, as shown by the following table,

| Lamp number | Output/W | Luminous flux/lm | Color temperature/K | Ra (8) |
|---|---|---|---|---|
| 1 | 9–23 | 600–1500 | 2700–5600 | 80 |
| 2 | 15–23 | 925–1580 | 3000 | 82 |
| 3 | 5–50 | 250–4300 | 2700–5000 | 82 |

-continued

| Lamp number | Output/W | Luminous flux/lm | Color temperature/K | Ra (8) |
|---|---|---|---|---|
| 4 | 5–20 | 250–1200 | 2700–6000 | 82 |
| 5 | 5–20 | 250–4000 | 2700–8500 | 82 |
| 6 | 18–32 | 1250–2200 | 2700 | 82 |
| 7 | 5–54 | 250–3200 | 2700–4100 | 80 | to employ conventional phosphors in achieving quite different light colors in conjunction with a color rendering index of Ra(8)=80 to 82. The life as specified is generally about 8,000 hours.

Catalogs of leading lamp manufacturers also disclose that in the case of linear fluorescent lamps it is possible to achieve extended useful lives by means of protective layers. A known method for this is to coat the glass bulb by decomposing gaseous compounds or by applying a slurry in the form of a suspension comprising the protective agent. This phosphor-containing layer is generally applied on top of the protective layer. DE 3 322 390, however, also describes a method in which, conversely, an aluminum protective layer covers the phosphor layer applied to the lamp bulb, said protective layer being applied in the conventional manner, and similarly to the phosphor-containing layer, by means of a water-soluble suspension. A method for treating the glass surface by ion exchange and sealing by means of the protective layer is described in DE 3 023 397. Further examples are listed in U.S. Pat. No. 4,923,425 and U.S. Pat. No. 4,344,016. EP 0 762 479 describes a lamp in which the protective layer is achieved by hydrolysis of organometallic compounds which are admixed to the phosphor-containing suspension. In DE 3 322 390 a rare earth oxide layer in the nanometer range is prepared by flushing the lamp bulb with a suitable organometallic solution, followed by a sintering process.

Color rendering with the standard compact lamps known hitherto does not or not significantly exceed the Ra(8) value of 82 and is therefore classified as color rendering class IB.

EP 0 550 937 A2 disclosed a mercury vapor low-pressure discharge lamp having color rendering glass IA. This includes lamps having a higher wall load of E(UV)>500 $W/m^2$. The color point (x, y) is located on or near the Planck curve, and the efficiency of the luminescence is comparatively high. Still, it is about 25 to 30 percent or even more below the efficiency of comparable standard compact lamps. The phosphor layer used in the lamp as claimed in EP 0 550 937 comprises three phosphors. The first is a blue-emitting phosphor activated with bivalent europium. The second phosphor is activated with bivalent manganese and has at least one emission band in the red spectral region. The third phosphor, which has its main emission in the yellow spectral region, is a (strontium, barium, calcium) orthosilicate activated with bivalent europium.

In the mercury vapor low-pressure discharge lamp as claimed in EP 0 596 548 A1, five luminescent materials are used as a phosphor, in order to achieve very good color rendering in conjunction with low aging of the lamp. The reduction in luminous flow of such deluxe lamps does, however, amount to more than 30 percent compared with standard compact lamps.

It is an object of the invention to improve the quality of use of the compact energy saving lamp, the aim being to achieve a high initial luminous flux and improved color rendering characteristics in conjunction with long life.

This object is achieved by the compact energy saving lamp having a very similar color temperature of between 2300 K and 6500 K comprising a discharge vessel which is fabricated so as to be vacuum-tight, which is filled with mercury and noble gas and on whose inner wall side the luminescent layer is disposed on top of an interlayer comprising silicon and/or aluminum and/or boron, and means for maintaining the discharge, the power density of the power absorbed by the column relative to the luminescent layer preferably being greater than 500 W/m$^2$ and the UV radiation predominantly having energies greater than 3.5 eV, is to fabricate, wherein the luminescent layer comprises at least two phosphors. According to the invention, the luminescent layer comprises as a first phosphor a green-emitting gadolinium magnesium borate silicate, activated with cerium and terbium (BSCT) having the composition

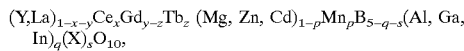

$(Y,La)_{1-x-y}Ce_xGd_{y-z}Tb_z(Mg, Zn, Cd)_{1-p}Mn_pB_{5-q-s}(Al, Ga, In)_q(X)_sO_{10}$, where X=Si, Ge, P, Zr, V, Nb, Ta, W or the sum of a plurality of the elements listed
  and it is further the case that
    p=0 and z≠0, $0.01 \le x \le 1-y-z$ $0 \le y \le 0.98$ $y+z \le 0.99$ $0.01 \le z \le 0.75$ $0 \le q \le 1.0$ $0 \le s \le 1.0$ and as a second phosphor, emitting in the red spectral region, preferably comprises yttrium oxide:Eu$^{3+}$ which has the formula $Y_{2-x}Eu_xO_3$, where $0.01<x<0.2$.

Table 1 shows a few examples of such improved warm-hue compact lamps embodied as a high-standard compact lamp within the tolerance ellipse.

TABLE 1

| CL number | Relative luminous flux | Color temperature/K | x,y coordinates | | Ra(8) |
|---|---|---|---|---|---|
| | | | x | y | |
| 1 | 104 | 2682 | 0.4667 | 0.4207 | 84 |
| 2 | 104 | 2704 | 0.4650 | 0.4205 | 84 |
| 3 | 105 | 2727 | 0.4633 | 0.4204 | 84 |
| 4 | 106 | 2749 | 0.4632 | 0.4234 | 84 |
| 5 | 106 | 2783 | 0.4615 | 0.4247 | 84 |

The relative luminous flux in the above is given in percent relative to the average value of a conventional compact lamp having a color temperature of about 2700 K. This compact energy saving lamp with the luminescent layer comprising at least two phosphors can be improved, in terms of its quality parameters such as color rendering and high luminous flux, by use being made, according to the invention, of a third phosphor, activated with bivalent europium, SAPE having the composition

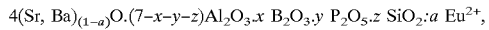

$4(Sr, Ba)_{(1-a)}O.(7-x-y-z)Al_2O_3.x\ B_2O_3.y\ P_2O_5.z\ SiO_2:a\ Eu^{2+}$, where $0.0001 < a < 0.8$ $0.001 < x, y, z < 0.1$ or of a third phosphor, activated with bivalent europium, (BSOSE) or SBOSE) having the compositions for BSOSE:

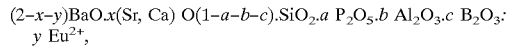

$(2-x-y)BaO.x(Sr, Ca)O(1-a-b-c).SiO_2.a\ P_2O_5.b\ Al_2O_3.c\ B_2O_3$: $y\ Eu^{2+}$, where $0.4 < x < 1.6$ $0.005 < y < 0.5$ $0.001 < a, b, c < 0.1$ and for SBOSE:

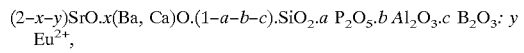

$(2-x-y)SrO.x(Ba, Ca)O.(1-a-b-c).SiO_2.a\ P_2O_5.b\ Al_2O_3.c\ B_2O_3$: $y\ Eu^{2+}$, where $0.11 < x < 0.4$ $0.005 < y < 0.5$ $0.0001 < a, b, c < 0.3$.

In the case of compact energy saving lamps having high color temperature of the quality level high-standard super compact lamp use is made, according to the invention, as a further additional third or as a fourth phosphor, activated with bivalent europium, of barium magnesium aluminate (BAM) having the formula $Ba_{1-x}Eu_xMgAl_{10}O_{17}$, where $0.02<x<0.2$.

TABLE 2

| CL number | Relative luminous flux | Color temperature/K | x,y coordinates | | Ra(8) |
|---|---|---|---|---|---|
| | | | x | y | |
| 6 | 102 | 2791 | 0.4542 | 0.4121 | 87 |
| 7 | 102 | 2808 | 0.4542 | 0.4244 | 87 |
| 8 | 103 | 2792 | 0.4564 | 0.4164 | 86 |
| 9 | 103 | 2757 | 0.4585 | 0.4156 | 86 |
| 10 | 104 | 2725 | 0.4623 | 0.4184 | 85 |
| 11 | 103 | 2712 | 0.4657 | 0.4228 | 87 |
| 12 | 102 | 2811 | 0.4586 | 0.4230 | 87 |
| 13 | 102 | 2718 | 0.4652 | 0.4229 | 87 |
| 14 | 103 | 3000 | 0.4407 | 0.4121 | 88 |
| 15 | 105 | 3501 | 0.4085 | 0.3999 | 90 |
| 16 | 104 | 3006 | 0.4395 | 0.4103 | 88 |
| 17 | 104 | 5003 | 0.3461 | 0.3650 | 92 |
| 18 | 103 | 6429 | 0.3133 | 0.3343 | 93 |
| 19 | 104 | 6402 | 0.3131 | 0.3399 | 91 |

Table 2 contains a few selected results. The relative luminous flux is specified in percent, relative to a standard compact lamp having an analogous color temperature.

If, according to the invention, use is made, as a fourth or fifth phosphor in the form of an additional broadband emitter red component, of manganese-activated borate silicate (BSCM) having the composition

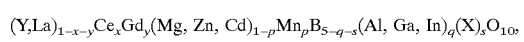

$(Y,La)_{1-x-y}Ce_xGd_y(Mg, Zn, Cd)_{1-p}Mn_pB_{5-q-s}(Al, Ga, In)_q(X)_sO_{10}$, where X=Si, Ge, P, Zr and it is further the case that
p≠0, $0.01 \le x \le 1-y$ $0 \le y \le 0.99$ $0.01 \le p \le 0.3$ $0 \leq q \leq 1.0$ $0 \leq s \leq 1.0$, the gadolinium being partially substitutable by terbium and as a result of which, in addition to the manganese emission, the characteristic terbium emission arises which has an emission maximum at 542 nm, a super-C compact lamp of color rendering class IA having an Ra(8) value of 90 and more is achieved, as can be gathered from the selected examples shown in Table 3.

TABLE 3

| CL number | Relative luminous flux | Color temperature/K | x | y | Ra(8) |
|---|---|---|---|---|---|
| 20 | 97 | 6374 | 0.3146 | 0.3325 | 94 |
| 21 | 99 | 5008 | 0.3460 | 0.3654 | 93 |
| 22 | 99 | 3527 | 0.4088 | 0.4039 | 90 |
| 23 | 98 | 6448 | 0.3125 | 0.3378 | 93 |
| 24 | 87 | 2995 | 0.4369 | 0.4036 | 92 |
| 25 | 94 | 3493 | 0.4143 | 0.4141 | 91 |
| 26 | 88 | 2860 | 0.4494 | 0.4117 | 91 |
| 27 | 87 | 2804 | 0.4533 | 0.4120 | 91 |
| 28 | 89 | 2783 | 0.4563 | 0.4150 | 90 |
| 29 | 90 | 2756 | 0.4566 | 0.4120 | 90 |
| 30 | 90 | 2716 | 0.4600 | 0.4131 | 90 |

The relative luminous flux is given in percent, relative to a standard compact lamp having a similar color temperature.

It can be seen from Table 3 that if the phosphors according to the invention on a borate silicate basis are used, the loss in luminous flux compared with conventional standard compact lamp types is distinctly lower with respect to the loss in luminous flux of conventional deluxe lamp types compared with standard compact lamps.

Examples of the usable phosphor mixing ratios in the compact energy saving lamps shown in Tables 1–3 can be seen in Table 4. In this context it should be borne in mind that these are mixing ratios which are strictly valid only for dedicated conditions specified for the examples listed. As the mixing ratio required is also determined by lamp output, optical characteristics and grain size distribution of the phosphors, preparation of the suspensions and layer thickness, the phosphor mixtures required in a specific case have to be determined separately, be it empirically or by mathematical modeling, without this making any difference with respect to the parameters that can be achieved with the phosphors used in the compact lamps.

TABLE 4

| CL number | Phosphor mixture/amount in grams |
|---|---|
| 1 | YOX:46.0 BSCT:31.0 |
| 2 | YOX:45.5 BSCT:31.0 |
| 3 | YOX:45.0 BSCT:31.0 |
| 4 | YOX:45.0 BSCT:32.0 |
| 5 | YOX:44.5 BSCT:32.5 |
| 6 | YOX:44.9 BSCT:27.3 SAPE:4.8 |
| 7 | YOX:44.6 BSCT:28.2 SAPE:4.2 |
| 8 | YOX:44.6 BSCT:29.1 SAPE:3.0 |
| 9 | YOX:45.2 BSCT:28.8 SAPE:3.0 |
| 10 | YOX:45.5 BSCT:30.0 SAPE:1.5 |
| 11 | YOX:46.7 BSCT:21.7 BSOSE:9.6 |
| 12 | YOX:45.3 BSCT:20.0 SAPE:0.8 BSOSE:11.3 |
| 13 | YOX:46.8 BSCT:25.3 SAPE:0.1 BSOSE:11.3 |
| 14 | YOX:43.0 BSCT:40.0 SAPE:8.3 BSOSE:1.5 |
| 15 | YOX:37.3 BSCT:27.8 SAPE:9.8 BAM:2.3 |

TABLE 4-continued

| CL number | Phosphor mixture/amount in grams |
|---|---|
| 16 | YOX:42.5 BSCT:26.3 SAPE:8.3 BAM:0 |
| 17 | YOX 27.3 BSCT:26.5 SAPE:14.5 BAM:7.5 |
| 18 | YOX:23.0 BSCT:25.5 SAPE:15.8 BAM:12.8 |
| 19 | YOX:22.3 BSCT:26.3 SAPE:15.8 BAM:12.0 |
| 20 | YOX:24.0 BSCT:23.0 SAPE:18.0 BSOSE:0 BAM:12.0 |
| 21 | YOX:28.0 BSCT:25.0 SAPE:17.0 BSOSE:0 BAM:7.0 |
| 22 | YOX:37.0 BSCT:26.0 SAPE:12.0 BSOSE:0 BAM:1.0 |
| 23 | YOX:23.0 BSCT:23.0 SAPE:19.0 BAM:11.0 |
| 24 | YOX:21.0 BSCT:11.0 SAPE:9.0 SBOSE:18 BSCM 19.0 |
| 25 | YOX:29.0 BSCT:22.0 SAPE:10.0 BAM:0 BSCM 10.0 |
| 26 | YOX:25.0 BSCT:16.0 SAPE:7.0 SCOSE:12 BSOSE:1.0 BSCM:20.0 |
| 27 | YOX:24.0 BSCT:16.0 SAPE:6.0 SBOSE:12 BSOSE:1.0 BSCM:22.0 |
| 28 | YOX:27.0 BSCT:17.0 SAPE:5.0 BSOSE:2 SBOSE:11 BSCM:19.0 |
| 29 | YOS:28.0 BSCT:17.0 SAPE:6.0 BSOSE:0 SBOSE:13 BSCM:17.0 |
| 30 | YOX:29.0 BSCT:16.0 SAPE:5.0 BSOSE:2 SBOSE:12 BSCM:17.0 |

All the compact lamp types listed are distinguished in that it is possible for a thin protective layer of a high-reflectance radiation- and discharge-stable material and/or a protective layer on the inside of the phosphor layer to be applied to the inside of the glass bulb.

Application of a phosphor layer to the inner wall of the lamp bulb is generally effected by the phosphor or the phosphor mixture being dispersed in a viscous medium, which comprises an organic binder such as e.g. hydroxyethyl cellulose or polyox and a solvent. The phosphor suspension is distributed on the glass bulb to produce a uniform film which is dried, while heat is supplied and air is introduced, by evaporation of the solvent, generally water. The organic constituents of the binder are removed in a burn-out process by brief heating of the phosphor-coated glass bulb with the introduction of air or oxygen to at most 660° C.

The processing characteristics of the suspension can be improved by means of cosolvents, wetting agents and antifoaming agents. The suspension can further be admixed with additives which increase the adhesiveness of the layer, e.g. borates or phosphates, or which improve the stability of individual phosphors, and substances to adjust the pH. The admixture of substances having a high specific surface area enables the density of the layer to be increased and the amount of phosphor used to be reduced.

Extension of the lamp life can be achieved not only by protective layers on the glass bulb between glass and phosphor layer, but also by applying a protective layer to the inside of the phosphor layer, which as a result becomes more or less completely covered.

All the protective layers mentioned can be generated in various ways, firstly by successive application of a plurality of suspensions after drying and burn-out of each layer, secondly by various combinations of two organic binders for each individual layer and a common burn-out step, and thirdly by deposition and decomposition of a volatile compound which is introduced into the lamp bulb.

Shown below are working examples for the fabrication of the compact energy saving lamps using phosphor mixtures according to the invention having various compositions according to Table 4.

EXAMPLE 1

Using the phosphor mixtures numbers 1–10 according to Table 4, test lamps are prepared by means of 100 g of phosphor mixture being dispersed in 33 ml of deonized water, 0.5 ml of dispex, 80 ml of 5% strength polyox, 2.5 ml of arkopal and 35 ml of 10% strength alon-C solution. Monoethanolamine is added to set a pH of 9.5. Burn-out of the lamps is carried out after drying in an air stream at 550° C. With a suspension viscosity of 1.5 dPas, a coverage of the burnt-out lamp of about 4.5 mg·cm$^{-2}$ is achieved.

EXAMPLE 2

For test lamps comprising the phosphor mixtures numbers 11–19 according to Table 4, 100 g of phosphor mixture is dispersed with 70 ml of deionized water, 0.5 ml of dispex, 80 ml of 5% strength polyox and 2.5 ml of arkopal. The lamps are dried in an air stream and burnt out at 550° C.

EXAMPLE 3

Using the phosphor mixtures numbers 20–30 according to Table 4, compact energy saving lamps are prepared by means of 100 g of phosphor mixture being dispersed in 70 ml of deionized water, 0.5 ml of dispex, 80 ml of 5% strength polyox and 2.5 ml of arkopal. Boric acid is added to set a pH of 9.5. With a suspension viscosity of 1.5 dPas, a coverage of the burnt-out lamp of about 5 mg·cm$^{-2}$ is achieved. Burn-out is carried out after drying in an air stream at 550° C.

EXAMPLE 4

Phosphor suspensions according to Examples 1–3 are applied to lamp bulbs having a protective layer of silicon dioxide. The protective layer has a coverage of 0.4 mg·cm$^{-2}$.

EXAMPLE 5

Compact energy saving lamps according to Examples 1–4 are provided with a continuous layer of aluminum oxide which is applied to the surface of the phosphor layer. This protective layer is generated by a carrier gas mixture of nitrogen and oxygen being passed into aluminum isopropoxide at about 160° C., followed by thermal decomposition of the aluminum isopropoxide vapor when the laden carrier gas is introduced into a lamp bulb heated to 500° C.

What is claimed is:

1. A compact energy saving lamp having high luminous flux and long life and a very similar color temperature of between 2300° K and 6500° K comprising a vacuum-tight discharge vessel, said discharge vessel filled with mercury and noble gas and whose inside is provided with a luminescent layer, and further comprising means for maintaining said discharge, the power density of the power absorbed by the column relative to the luminous layer being greater than 500 W/m$^2$ and the UV radiation being greater than 3.5 eV, wherein the luminescent layer comprises at least two phosphors: a first phosphor comprising a green-emitting gadolinium magnesium borate silicate, activated with cerium and terbium (BSBT), having the composition

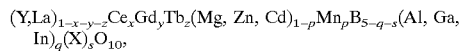

where X is Si; Ge, P, Zr, V, Nb, Ta, W or mixtures thereof, with the proviso that X must include Si; p=0; z≠0; 0.01≦x≦1−y−z; 0≦y≦0.98; y+z≦0.99; 0.01≦z≦0.75; 0≦q≦1.0; and or 0<s≦1.0; and a second phosphor, yttrium oxide:Eu$^{3+}$, which emits in the red spectral region and has the formula Y$_{2-x}$Eu$_x$O$_3$, where 0.01<x<0.2.

2. The compact energy saving lamp as claimed in claim 1 wherein, for the purpose of improved color rendering, said luminescent layer comprises a third phosphor, activated by divalent europium, which is (a) SAPE having the formula

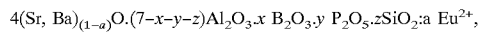

where 0.0001<a<0.8; and 0.001<x, y, z<0.1 or (b) BSOSE or SBOSE wherein BSOSE has the composition

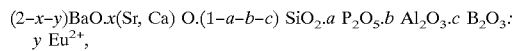

where 0.4<x<1.6, 0.005<y<0.5 and 0.001<a, b, c<0.1 and SBOSE has the composition

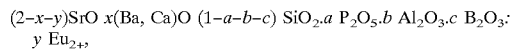

where 0.11<x<0.4; 0.005<y<0.5; and 0.0001<a, b, c<0.3.

3. The compact energy saving lamp as claimed in claim 1 wherein, for the purpose of improved color rendering, said luminescent layer includes a third phosphor, activated with bivalent europium, comprising barium magnesium alluminate (BAM) having the formula Ba$_{1-x}$Eu$_x$MgAl$_{10}$O$_{17}$, where 0.02<x<0.20.

4. The compact energy saving lamp as claimed in claim 1 wherein, for the purpose of improved color rendering, said luminescent layer includes a red broadband emitter component, manganese-activated borate silicate (BSCM), having the composition

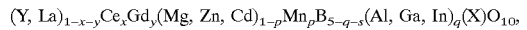

where X is Si, Ge, P or Zr; p≠0; 0.01≦x≦1−y; 0≦y≦0.99; 0.01≦p≦0.3; 0≦q≦1.0; and 0≦s≦1.0, the gadolinium being partially substitutable by terbium and as a result of which, in addition to the manganese emission, a characteristic terbium emission arises having an emission maximum at 542 nm.

5. The compact energy saving lamp as claimed in claim 1 wherein a protective layer comprising aluminum and/or boron is applied between glass and the luminescent layer.

6. The compact energy saving lamp as claimed in claim 1 wherein a protective layer comprising aluminum oxide and/or silicon dioxide is applied to the inside of the luminescent layer.

7. The compact energy saving lamp as claimed in claim 6 wherein the protective layer is applied to the bulb surface by means of a wet process.

8. The compact energy saving lamp as claimed in claim 5 wherein said protective layer comprises aluminum oxide and/or silicon oxide.

* * * * *